United States Patent [19]

Yoshioka et al.

[11] Patent Number: 4,959,191

[45] Date of Patent: Sep. 25, 1990

[54] METHOD FOR BLOW MOLDING LARGE HOLLOW BODIES

[75] Inventors: Masanori Yoshioka, Tokyo; Masafumi Kozai, Yokohama, both of Japan

[73] Assignee: Nissan Motor Company, Ltd., Japan

[21] Appl. No.: 414,545

[22] Filed: Sep. 29, 1989

[51] Int. Cl.[5] .................. B29C 33/24; B29C 49/04; B29C 49/32; B29C 49/56

[52] U.S. Cl. ............................ 264/529; 264/542; 425/451; 425/451.9; 425/541

[58] Field of Search ............ 264/529, 540, 542, 526, 264/523, 535, 537; 425/541, 451.9, 451, 538

[56] References Cited

U.S. PATENT DOCUMENTS

| | | | |
|---|---|---|---|
| 3,396,427 | 8/1968 | Raspante | 264/540 X |
| 3,809,739 | 5/1974 | Gelin | 264/325 X |
| 4,468,368 | 8/1984 | Hafele | 264/542 X |
| 4,762,486 | 8/1988 | Windstrup et al. | 425/541 |
| 4,882,119 | 11/1989 | Ajmera | 264/526 |

Primary Examiner—Jan H. Silbaugh
Assistant Examiner—Catherine Timm
Attorney, Agent, or Firm—Low, Price, LeBlanc, Becker & Shur

[57] ABSTRACT

An apparatus and method for blow molding large hollow bodies, such as automotive fuel tanks and the like, is disclosed. A fluidized plastic material injection head is located above a given portion of rails. A plurality of mold carriers are disposed on the rails through wheels, each mold carrier carrying thereon mold halves. A clamping device is mounted on each mold carrier to clamp the mold halves together. A hydraulic press device is located near the injection head and presses the mold halves against each other to achieve a tight coupling of them when operated.

3 Claims, 5 Drawing Sheets

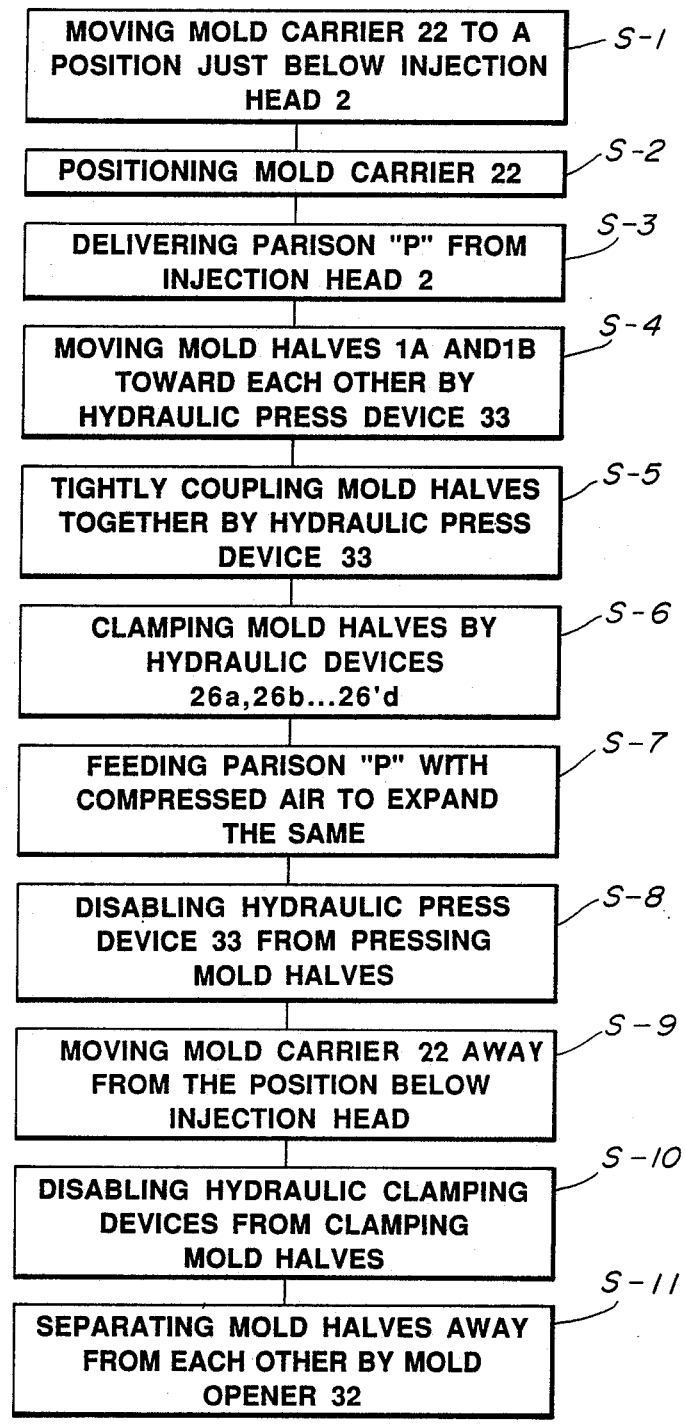

METHOD FOR BLOW MOLDING LARGE HOLLOW BODIES

BACKGROUND OF THE INVENTION

1. Field of the Invention

The present invention relates, in general, to a method and an apparatus for blow molding large hollow bodies, and more particularly, to a method and an apparatus for blow molding fuel tanks of a motor vehicle and the like.

2. Description of the Prior Art

In order to clarify the task of the present invention, one conventional method and apparatus for blow molding fuel tanks of a motor vehicle will be described with reference to FIGS. 6, 7A and 7B of the accompanying drawings Referring to FIG. 6, there is shown but schematically a blow molding apparatus. Designated by numerals 1A and 1B are mold halves, each having a cavity formed therein, which are arranged for movement toward and away from each other. When the split mold halves 1A and 1B are coupled together, the cavities of them will define the walls of a product, viz., the blow-molded fuel tank. Positioned above the mold halves 1A and 1B is an injection head 2 from which a fluidized plastic material is fed into the cavity of the coupled mold halves. The injection head 2 is arranged to move vertically and connected to a known plastic material fluidizing machine (not shown). The injection head 2 delivers therefrom a tubular parison "P" of the fluidized plastic material. Designated by numeral 3 is an air nozzle from which compressed air is fed into the parison "P" to expand the same into engagement with the walls of the closed cavity of the coupled mold halves, as will become apparent hereinafter.

Referring to FIGS. 7A and 7B, there is shown a conventional mold carrier 10 which is incorporated with the vertically movable injection head 2. The mold carrier is movable rightwardly and leftwardly as indicated by the arrow "A" and carries thereon two sets of split molds 11 and 12, each split mold 11 or 12 including mold halves 1A and 1B. As shown, each mold half 1A or 1B is secured to a platen 14 of a hydraulic press device 13. Two air nozzles 3 are connected to the carrier 10, which are incorporated with the split molds 11 and 12, respectively.

In order to produce the fuel tank by using the above-mentioned blow molding apparatus, the following operation steps have been employed.

First, the mold carrier 10 is moved to one work position wherein one (for example, the mold 11) of the split molds 11 and 12 is positioned just below the injection head 2, as shown in FIG. 7A. Then, with the mold halves 1A and 1B kept separated, the injection head 2 delivers a parison "P" of the fluidized plastic material between the separated mold halves 1A and 1B. Then, by operating the hydraulic press devices 13, the mold halves 1A and 1B are moved toward each other and coupled together to pinch the parison "P". Then, compressed air is fed from the air nozzle 3 into the parison "P" to expand the parison "P" until the time when the wall of the parison "P" is tightly pressed against the walls of the closed cavity of the coupled mold halves 1A and 1B.

Thereafter, the mold carrier 10 is moved back to the other work position wherein the other (viz., the split mold 12) of the split molds 11 and 12 is positioned just below the injection head 2. Then, substantially same operation steps as the above-mentioned steps are carried out on the other split mold 12. During the molding steps on the mold 12, the previously finished mold 11 is cooled and then a product, viz., a molded fuel tank is removed from the mold 11 by separating the mold halves 1A and 1B.

However, the above-mentioned conventional blow molding method and apparatus have the following drawbacks.

First, due to the inherent construction of the mold carrier 10, four heavy and bulky hydraulic press devices 13 must be mounted on the mold carrier 10 for actuating the two split molds 11 and 12. This causes increase in weight and size of the mold carrier 10.

Second, because of the construction of the mold carrier on which only two split molds 11 and 12 are mounted, there is a severe limitation in speeding up the production cycle possessed by the apparatus.

Third, it is almost impossible to produce various types of products by using the apparatus. That is, in such case, various molds must be mounted to and removed from the mold carrier 10 one after another imposing a troublesome manual labor upon an operator.

SUMMARY OF THE INVENTION

It is therefore an object of the present invention to provide a method and an apparatus for blow molding large hollow bodies, which are free of the above-mentioned drawbacks.

According to the present invention, there is provided an apparatus for blow molding hollow bodies, which comprises rails extending in a given direction; a plastic material fluidizing machine having a material injection head positioned above a given part of the rails, the injection head delivering a tubular parison of the fluidized plastic material; a plurality of mold carriers movably disposed on the rails through wheels; mold halves carried on each of the mold carriers, the mold halves being arranged to move toward and away from each other in a direction substantially perpendicular to the given direction; a compressed air supply nozzle carried on each mold carrier, the nozzle being insertable into the parison to feed the interior of the parison with compressed air; clamping means mounted on each mold carrier, the clamping means clamping the mold halves together when operated; a hydraulic press device located near the injection head, the hydraulic press device pressing the mold halves against each other, when operated, to achieve a tight coupling of the mold halves; and a mold opener located at a distance from the injection head, the mold opener separating the mold halves away from each other when operated.

According to the present invention, there is further provided a method for blow molding a hollow body, which comprises by steps: (a) moving mold halves to a first position just below a material injection head while keeping the mold halves separated; (b) injecting a fluidized plastic material from the injection head to produce a tubular parison between the separated mold halves; (c) moving the mold halves toward each other and coupling them together with a first given pressing force; (d) clamping the mold halves together with a second given pressing force; (e) feeding the interior of the parison with compressed air to expand the same into engagement with walls of the cavity of the coupled mold halves, the compressed air being set at a first given magnitude; (f) reducing the magnitude of the compressed air to a second given magnitude; (g) removing the first given pressing force applied to the mold halves at the step (c); (h) moving the mold halves from the first position to a second position which is at a distance from the first position; and (i) removing the second given pressing force applied to the mold halves at the step (d).

BRIEF DESCRIPTION OF THE DRAWINGS

Other objects and advantages of the present invention will become apparent from the following description when taken in conjunction with the accompanying drawings, in which:

FIG. 5 is a process table showing the operation steps carried out in the method of the present invention;

DETAILED DESCRIPTION OF THE INVENTION

Figure 1:
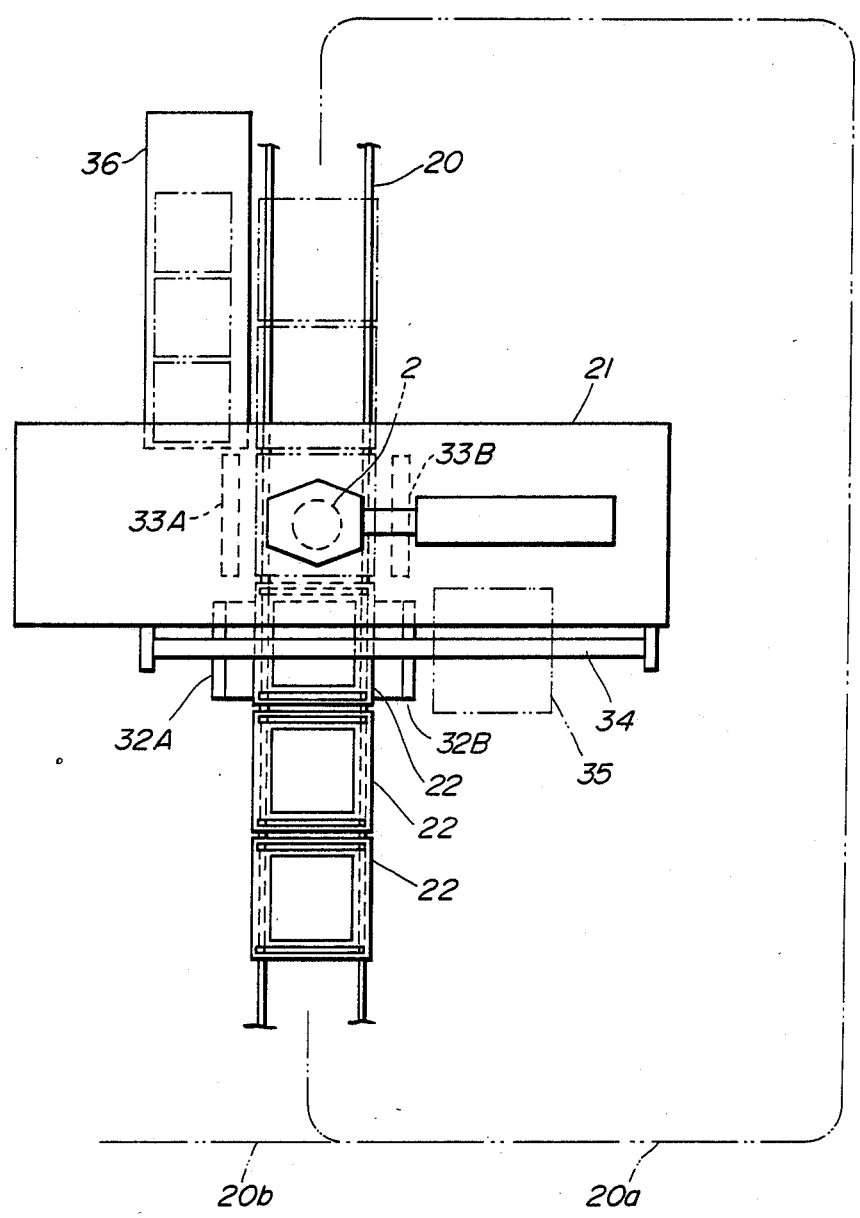
FIG. 1 is a plan view of a blow molding apparatus which embodies the present invention.

Referring to FIGS. 1 to 4, particularly FIG. 1, there is shown a blow molding apparatus according to the present invention.

Looped rails 20a are arranged on a base board. A material fluidizing machine 21 is arranged to straddle a straight part 20 of the rails 20. The machine 21 has a material injection head 2 directed downward toward the straight rail part 20.

Three mold carriers 22 are movably arranged on the rails 20a and they are coupled like a train.

Figure 2:
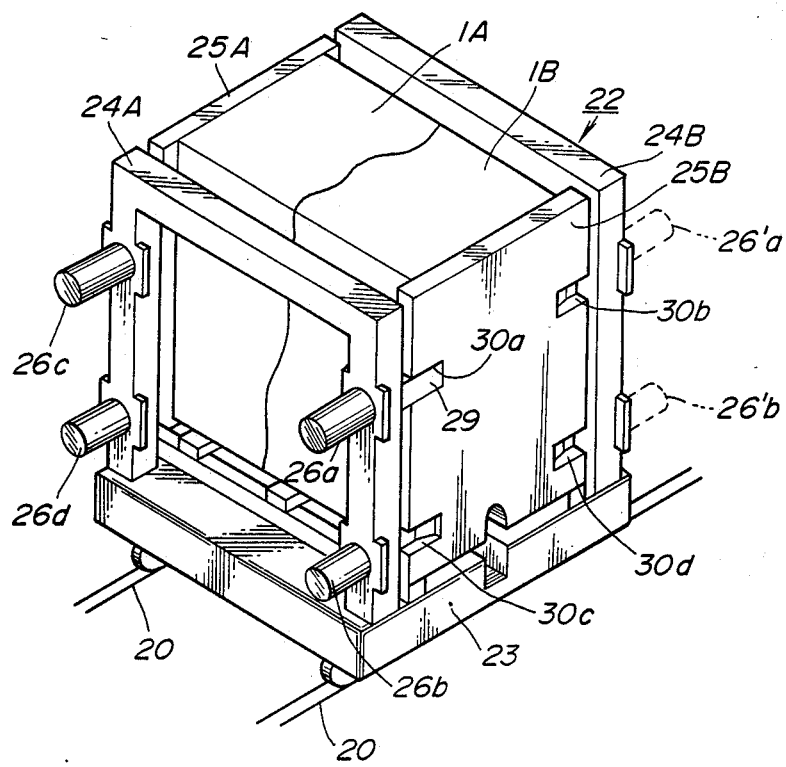
FIG. 2 is a perspective view of a mold carrier which is employed in the blow molding apparatus of the present invention.
Figure 3:
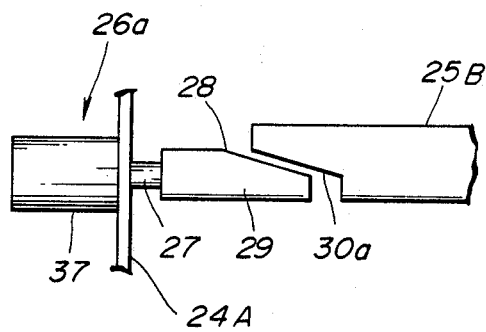
FIG. 3 is a sectional view of a hydraulic clamping device mounted on the mold carrier of FIG. 2.
Figure 4:
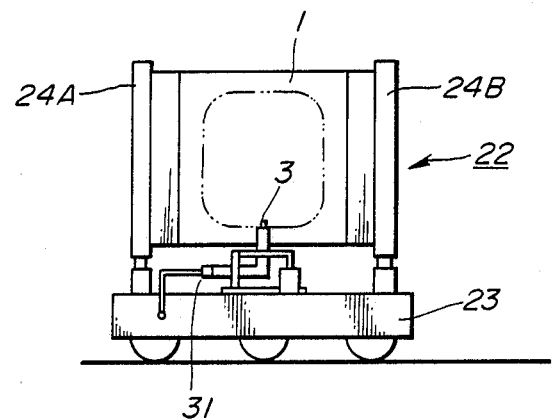
FIG. 4 is a front view of the mold carrier.
Figure 6:
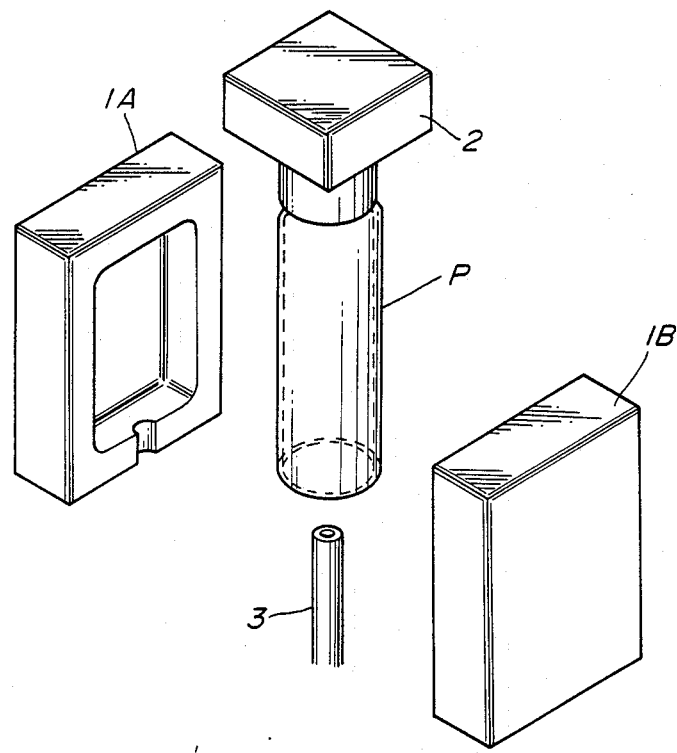
FIG. 6 is a schematic illustration showing mold halves in a separated condition and a tubular parison delivered from a material injection head.

As is shown in FIGS. 2 to 4, each mold carrier 22 comprises a chassis 23 having wheels (no numerals) put on the rails 20a, and front and rear rectangular frames 24A and 24B vertically mounted on the chassis 23. Mold halves 1A and 1B are laterally movably disposed on the chassis 23 between the front and rear frames 24A and 24B. That is, these mold halves 1A and 1B are arranged for movement toward and away from each other along the frames 24A and 24B. Each mold half 1A or 1B has a platen 25A or 25B integrally connected thereto.

Four hydraulic clamping devices 26a, 26b, 26c and 26d (or 26'a, 26'b, 26'c and 26'd) are mounted on each of the frames 24A or 24B. These hydraulic clamping devices function to clamp the mold halves 1A and 1B together, as will become clear hereinafter.

As is understood from FIG. 3, each hydraulic clamping device comprises a hydraulic cylinder 37 secured to the frame 24A or 24B, a piston rod 27 extending from the cylinder 37 toward the platen 25B or 25A, and a wedge head 29 fixed to the leading end of the piston rod 27. As shown in FIG. 3, the wedge head 29 has a slanted surface 28 formed thereon.

As is seen from FIGS. 2 and 3, each platen 25B or 25A is formed with four recesses 30a, 30b, 30c and 30d into which the wedge heads 29 of the corresponding hydraulic clamping devices are thrusted when the coupling of the mold halves 1A and 1B is needed. As is seen from FIG. 3, each recess 30a has a slanted bottom surface (no numeral) with which the slanted surface 28 of the wedge head 29 is frictionally engageable.

As is seen from FIG. 4, an air supply device 31 is mounted on the chassis 23, which has an air nozzle 3 insertable into a parison "P" delivered from the material injection head 2.

As will be seen from FIG. 1, near the material fluidizing machine 21, there is arranged a mold opener (32A + 32B) which has left and right units 32A and 32B located at opposite positions with respect to the straight rail part 20. The mold opener (32A + 32B) functions to separate the mold halves 1A and 1B away from each other.

Furthermore, at a position just below the material injection head 2, there is arranged a hydraulic press device (33A + 33B) which has left and right units 33A and 33B located at opposite positions with respect to the straight rail part 20. In the illustrated embodiment, the hydraulic press device is carried by the material fluidizing machine 21. When the mold carrier 22 comes to the position of the hydraulic press device, the right and left units 33A and 33B press the platens 25A and 25B toward each other to achieve a tight coupling of the mold halves 1A and 1B. As will become apparent as the description proceeds, the hydraulic press device (33A + 33B) is designed to bear against a pressure greater than 5 kg/cm² in magnitude.

As is seen from FIG. 1, an overhead loader 34 is arranged above the mold opener (32A + 32B), which picks up a molded product (viz., fuel tank) from the separated mold halves 1A and 1B and transfers the same to a deburring machine 35 where the molded product is trimmed.

Designated by numeral 36 is a mold changing device by which various molds are easily mounted to the mold carriers 22.

In the following, the steps for blow molding automotive fuel tanks will be described with reference to the process table of FIG. 5.

First, a selected mold carrier 22 is moved, by a known drive means (not shown), to a position just blow the injection head 2 of the material fluidizing machine 21 (STEP-1). The mold carrier 22 is set at a given position with respect to the injection head 2 (STEP-2). Under this condition, the mold halves 1A and 1B on the mold carrier 22 are separated from each other. Then, the fluidized material is delivered from the injection head 2 to form a parison "P" which is positioned between the separated mold halves 1A and 1B (STEP-3).

Then, the hydraulic press device (33A + 33B) is energized to move the mold halves 1A and 1B toward each other (STEP-4) and tightly couple them together (STEP 5). Then, the hydraulic clamping devices are energized to clamp the mold halves 1A and 1B (STEP-6). Thus, under this condition, the parison "P" is pinched by the coupled mold halves 1A and 1B. Then, the air supply device 31 is energized to feed, via the air nozzle 3, the interior of the parison "P" with compressed air to expand the parison "P" into engagement with the walls of the coupled mold halves 1A and 1B (STEP-7). The pressure of the compressed air is set about 5 kg/cm² With this, the parison "P" is expanded into a desired hollow shape, that is, the hollow shape of a fuel tank.

Then, the magnitude of the compressed air is reduced to about 3 kg/cm$^2$, and thereafter, the hydraulic press device (33A + 33B) is deenergized to detach the left and right units 33A and 33B from the associated platens 25B and 25B of the mold halves 1A and 1B (STEP-8). It is to be noted that even in this condition, the coupling of the mold halves 1A and 1B is maintained by the work of the hydraulic clamping devices. Then, the mold carrier 22 is moved from the position of the injection head 2 to the position of the mold opener (32A + 32B) (STEP-9). When the mold halves 1A and 1B are cooled sufficiently, the hydraulic clamping devices 26a, 26b, 26c, 26d, 26'a, 26'b, 26'c and 26'd are operated to disengage the platens 25A and 25B (STEP-10) and then the mold opener (32A + 32B) is operated to separate the mold halves 1A and 1B from each other (STEP-11). Then, a molded product, viz., fuel tank, is removed from the separated mold halves 1A and 1B by the overhead loader 34 and transferred to the deburring machine 35 where the product is trimmed.

It is to be noted that, due to the provision of the hydraulic clamping devices, the mold carrier 22 can be transferred from the position of the material injection head 2 before the cooling of the mold halves 1A and 1B becomes sufficient. This increases the available time for which the injection head 2 is practically used, and thus, the productive efficiency of the apparatus is increased.

In the following, modifications will be described.

If desired, a branch rail part 20b may be connected to the looped rails 20a, as is illustrated in FIG. 1. In this case, feeding of stored mold carriers to and removing of in-use mold carriers from the looped rails 20a are readily achieved.

The rails may be of a straight type having both ends. In this case, the mold carriers 22 are moved reciprocatively on the rails.

Furthermore, if desired, four and more than four mold carries 22 may be used.

Figure 7A:
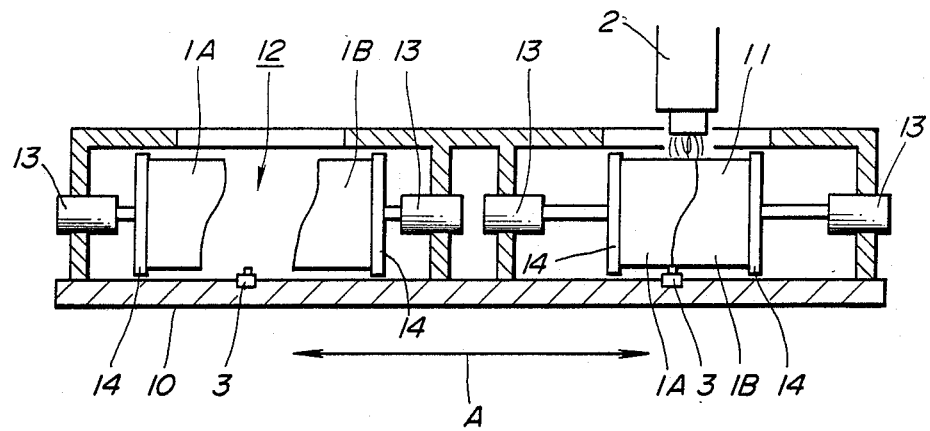
FIG. 7A is a vertically sectional view of a conventional mold carrier.
Figure 7B:
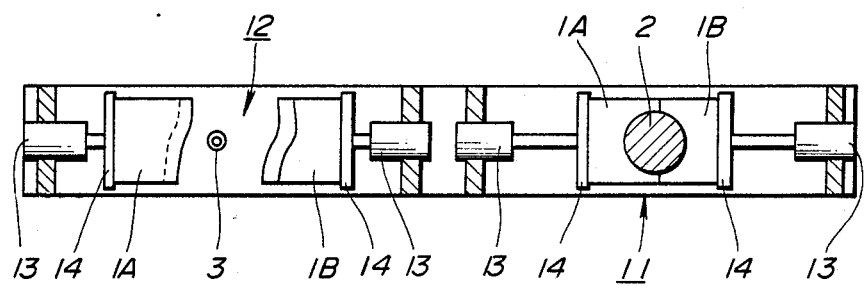
FIG. 7B is a horizontally sectional view of the conventional mold carrier.

As will be understood from the foregoing description, in the blow molding apparatus according to the present invention, the hydraulic press device (33A + 33B) which is heavy in weight is not mounted on the mold carrier 22. Thus, the mold carrier 22 is relatively light in weight as compared with the aforementioned conventional mold carrier of FIGS. 7A and 7B. This induces easy movement of the mold carrier 22 and thus induces a speed-up of the production cycle of the apparatus. Furthermore, due to usage of the looped production line and trained mold carriers, various types of products are available in the invention.

What is claimed is:

1. A method for blow molding a hollow body, comprising:
   (a) moving mold halves to a first position just below a material injection head while keeping said mold halves separated;
   (b) injecting a fluidized plastic material from said injection head to produce a tubular parison between the separated mold halves at said first position;
   (c) moving said mold halves toward each other with said parison therebetween and coupling them together with a first given pressing force, the coupled mold halves defining a cavity and said parison being pinched by the coupled mold halves;
   (d) then clamping said mold halves together with a second given pressing force;
   (e) feeding the interior of said parison with compressed air to expand the same into engagement with walls of the cavity of the coupled mold halves, said compressed air being set at a first given magnitude;
   (f) reducing the magnitude of said compressed air to a second given magnitude;
   (g) then removing said first given pressing force applied to said mold halves at the step (c) while maintaining the coupling of said mold halves with said second clamping force;
   (h) moving the clamped mold halves from said first position to a second position which is at a distance from said first position; and then
   (i) removing said second given pressing force applied to said mold halves at the step (d).

2. A method as claimed in claim 1, in which said first given pressing force is greater than said second given pressing force.

3. A method as claimed in claim 2, in which said first given magnitude of the compressed air is approximately 5 kg/cm$^2$ and said second given magnitude of the same is approximately 3 kg/cm$^2$.

* * * * *